United States Patent [19]

Vassiliou

[11] 3,986,993
[45] Oct. 19, 1976

[54] FLUOROCARBON COATING COMPOSITION

[75] Inventor: Eustathios Vassiliou, Newark, Del.

[73] Assignee: E. I. Du Pont de Nemours and Company, Wilmington, Del.

[22] Filed: Apr. 1, 1975

[21] Appl. No.: 564,216

[52] U.S. Cl. .......... 260/23 XA; 106/287 S; 260/29.6 F; 260/29.15 B; 260/42.27; 428/422
[51] Int. Cl.$^2$ .......................... C08L 91/00
[58] Field of Search .......... 260/23 XA, 29.6 F; 106/287 S

[56] References Cited
UNITED STATES PATENTS

| | | | |
|---|---|---|---|
| 2,592,147 | 4/1952 | Ikeda | 260/29.6 |
| 3,139,406 | 6/1964 | Mindick | 106/286 |
| 3,655,604 | 4/1972 | Strolle | 260/29.6 F |

Primary Examiner—Lewis T. Jacobs
Assistant Examiner—William E. Parker

[57] ABSTRACT

A composition containing fluorocarbon polymer, colloidal silica, alkyl benzene, water-miscible alcohol containing 4 or more carbon atoms, amine, fatty acid containing 8 or more carbon atoms, and liquid carrier is provided. This composition is useful for coating metal, especially cookware, to give a non-stick finish and also to provide an excellent primer coat.

10 Claims, No Drawings

FLUOROCARBON COATING COMPOSITION

BACKGROUND OF THE INVENTION

1. Field of the Invention

This invention relates to fluorocarbon coating compositions.

2. Prior Art

In recent years, the use of fluorocarbon polymers as lubricious coatings has become widespread. Cookware coated with fluorocarbon polymers, especially tetrafluoroethylene (PTFE), has become very popular; almost every housewife prefers to use such cookware in her kitchen because food is less likely to stick to it and because it is so easy to clean.

However, the fluorocarbon polymer's physical property which causes a lubricious coating also makes it difficult to bond fluorocarbon polymer coatings well enough to substrates to prevent the coatings from blistering and peeling away during use. This is especially true of PTFE.

This problem, involving the inherent nature of fluorocarbon polymers, is alleviated by first prime-coating the substrate with an adhesion promoting primer and then top-coating the primed substrate with a fluorocarbon polymer dispersion.

However, the known prime-coating compositions were inadequate for use with the newer, currently-used fluorocarbon polymer compositions which provide cookware top-coatings that are denser and less porous than the previous fluorocarbon polymer coatings. These current top-coatings make the cook-ware even easier to clean and improve their appearance by making the film glossier.

This inadequacy is because previously known prime-coating compositions contained a large quantity of water soluble salts, e.g., lithium salts. Water, which can penetrate the fluorocarbon top-coats, forms, in the presence of these water-soluble salts, high osmotic pressures which cause loss of adhesion and blistering. The previously used fluorocarbon top-coats had enough porosity to allow the salt solution to escape before the osmotic pressure buildup was sufficient to cause adhesion loss and blistering. The current, denser, less porous top-coats do not.

New prime-coat compositions were required and were developed to correct this problem. One example of such a new prime-coat composition is disclosed in Welch, Ser. No. 405,798, filed Oct. 12, 1973. These primers consist essentially of fluorocarbon abd colloidal silica. Although these compositions provide an excellent priming coat, they have a short storage life and require use during a relatively short time.

The coating composition of this invention provides an excellent priming coat and has a long storage life.

SUMMARY OF THE INVENTION

According to the present invention there is provided a coating composition consisting essentially of fluorocarbon polymer, colloidal silica, alkyl benzene, water-miscible alcohol containing four or more carbon atoms, liquid carrier, amine, and fatty acid.

DESCRIPTION OF THE INVENTION

While any of the compounds described within this application, or their equivalents, can be utilized within the invention, when cookware is involved, Food and Drug Administration approved or acceptable compounds should be used.

The fluorocarbon polymers used in this composition are those of hydrocarbon monomers completely substituted with fluorine atoms or a combination of fluorine atoms and chlorine atoms. Included in this group are polytetrafluoroethylene (PTFE), copolymers of tetrafluoroethylene and hexafluoropropylene (FEP) in all monomer unit weight ratios, and fluorochlorocarbon polymers such as polymonochlorotrifluoroethylene. PTFE is preferred because of the excellence of its properties.

The fluorocarbon polymers used are particulate. For the best results, the particles should be small enough to give the resulting film integrity. In most cases the particles should be no larger than 0.35 micron (measured optically against a standard) in the longest dimension.

Although a dry flour or powder of fluorocarbon polymer can be used and a liquid carrier provided separately, an aqueous dispersion of the polymer, in which a surfactant can be present, is preferred because of its easy obtainment on the market. In any case, the liquid also serves as a portion of the carrier for the composition.

The fluorocarbon polymer is present in the composition in a concentration of from about 20% through about 90%, by weight of the total solids. A concentration of 40–80 is preferred; 55–65% is even more preferred.

The colloidal silica used in the composition is generally in the form of an aqueous sol of silica particles. The silica particles are discrete uniform spheres of silica which have no internal surface area or detectable crystallinity. Some surface silica atoms may be replaced by aluminum atoms. The particles have a size of 5–100 millimicrons, preferably 7–25 millimicrons, as measured optically against a standard. The aqueous sol of silica has a specific surface area of 125–420 square meters per gram, and a pH of 8.4–9.9 at 25° C. Stabilizing additives can also be present in the aqueous sol. Examples of stabilizing additives are sodium hydroxide, ammonium hydroxide, and sodium aluminate. Typical of such colloidal silicas are those sold by E. I. du Pont de Nemours and Company as "Ludox HS-40", "Ludox-HS", "Ludox-LS", "Ludox SM-30", "Ludox-TM", "Ludox-AS", and "Ludox-AM". Mixtures of silicas can be used.

The colloidal silica is present in the composition at a concentration of from about 10% through 80%, preferably 10–50%, more preferably 15–30%, by weight of the total solids.

An alkyl benzene, e.g., toluene and xylene, must be present. The concentration of the aromatic hydrocarbon should be from 1–10%, preferably 4–8%, by weight of the total composition. One of the reasons for adding the aromatic hydrocarbon is to increase the viscosity of the composition.

An alcohol containing 4 or more carbon atoms which is water-miscible must be present. Examples of such alcohols are diethylene glycol monobutyl ether, butanol, and Cellosolve (trademark of Union Carbide Corporation for mono- and dialkyl ethers of ethylene glycol and their derivatives). Diethylene glycol monobutyl ether is the preferred alcohol. The concentration of the water-soluble alcohol should be from 1–10%, preferably 1–5%, by weight of the total composition. One of the reasons for adding the alcohol is to decrease the possibility of cracking of the dried composition.

The aromatic hydrocarbon and the water-soluble alcohol are also utilized to (a) facilitate the emulsification of silicone which can be added to the composition, (b) coordinate gelling of the two colloidal species, i.e., the dispersion of fluorocarbon and the colloidal silica. This coordination is very important because at a certain point of solvent evaporation the colloidal particles form a gel. The solvent content at this point depends on many factors (e.g., characteristics of the colloidal particle, rate of drying, nature of solvent). When two different colloidal systems co-exist in a finish, the optimum film properties will develop only if they both gel essentially at the same time with the network of one occupying the empty spaces of the network of the other. When this does not occur, the film will not be uniform, and depending on the relative amounts of the two colloidal systems, there will be many areas rich in one colloidal component (equivalent to phase separation). A surfactant consisting of a combination of an amine and a fatty acid is required to maintain satisfactory viscosity and shear-stability. Without this proper surfactant, premature coagulation and high-shear sensitivity will result.

The fatty acid is an organic acid having 8 or more carbon atoms. Examples of such fatty acids are palmitic acid, stearic acid, and oleic acid. Oleic acid is preferred. The fatty acid will usually be present at a concentration of 0.3–10%, preferably 0.4–5%, by weight of the total composition.

The amine is a compound of the formula

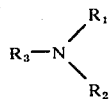

wherein $R_1$ contains 1 to 6 carbon atoms and may contain other functional groups, and $R_2$ and $R_3$ contain one to six carbon atoms or H.

Examples include ethanolamine, diethylethanolamine, triethylamine, and triethanolamine. Triethanolamine is preferred. There must be sufficient amine present to neutralize the acidity of the fatty acid. The amine will usually be present at a concentration of 0.8–15%, preferably 0.9–10%, by weight basis of the total composition.

The composition of this invention can be pigmented or unpigmented. Any pigment or combination of pigments ordinarily used in this sort of composition can be used. Typical of these pigments are titanium dioxide, aluminum oxide, silica, cobalt oxide, iron oxide, and carbon black. The total amount of pigment ordinarily present is at a concentration of up to 40%, preferably 1–10%, by weight of the total solids in the composition. The pigment is usually in a suitable pigment dispersion when added to the composition.

Anti-mudcracking agents, such as silicone and/or a polymer adjunct, can be added to the composition.

The silicone is present at a concentration of up to 10%, preferably 1–5%, by weight of solids.

The polymer adjunct can be any polymer of ethylenically unsaturated monomers which depolymerizes, and whose depolymerization products vaporize, in the temperature range of from about 150° C. below the fusion temperature of the fluorocarbon polymer used to about the fluorocarbon polymer's decomposition temperature. The closer the depolymerization and vaporization temperatures are to the fluorocarbon's fusion temperature, the better.

"Depolymerization" means degradation of the polymer to the point at which the degradation products are volatile at the temperatures encountered in curing the film. These degradation products can be monomers, dimers, or oligomers.

"Vaporize" means volatilization of the degradation products and their evaporation from the film.

Typically of the polymeric adjuncts which can be used are polymers of ethylenically unsaturated monomers which contain one or more monoethylenically unsaturated acid units.

Representative of these ethylenically unsaturated monomers are alkyl acrylates and methacrylates having 1–8 carbon atoms in the alkyl group, styrene, α-methyl styrene, vinyl toluene and glycidyl esters of 4–14 carbon atoms. Alkyl acrylates and methacrylates are preferred, because their decomposition temperatures are close to the fusion temperature of PTFE.

Representative of the monoethylenically unsaturated acids are acrylic acid, methacrylic acid, fumaric acid, itaconic acid and maleic acid (or anhydride). Acrylic acid and methacrylic acid are preferred because of their availability.

The preferred glycidyl ester unit is one derived from a product sold by the Shell Chemical Company as "Cardura E" ester. This is a mixed ester of the general formula

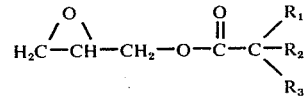

where
$R_1$ is $CH_3$ and
$R_2$ and $R_3$ are lower alkyl groups,
$R_1$, $R_2$ and $R_3$ containing a total of 7–9 carbon atoms.

The polymeric adjuncts preferred for use are 1. methyl methacrylate/2-ethylhexyl acrylate/methacrylic acid terpolymers, preferably the 35–50/40–60/1–15 (weight ratio) terpolymers;

2. butyl acrylate/methyl methacrylate/"Cardura E"/acrylic acid quadripolymers, preferably the 23–27/33–37/21–25/15–19 quadripolymers;

3. styrene/methyl methacrylate/Cardura E/acrylic acid quadripolymers, preferably the 28–32/28–32/21–15/15–19 quadripolymers;

4. methyl methacrylate/ethyl acrylate/methacrylic acid terpolymers, preferably the 30–45/45–60/1–15 terpolymers.

Mixtures of adjuncts can also be used.

The polymeric adjunct is ordinarily present in the composition at a concentration of from about 5–25%, preferably 5–15%, by weight of solids.

The coating composition of this invention is utilizable upon any conventionally used substrate. The substrate is preferably pretreated prior to application of the composition. Pretreatment methods include flame-spraying, frit-coating, grit-blasting, and acid- or alkali-treating. A metal substrate is preferably pretreated by grit-blasting, by flame-spraying of a metal or a metal oxide, or by frit-coating, although the composition can be applied successfully to phosphated, chromated, or untreated metal. A glass substrate is preferably grit-blasted or frit-coated.

The composition can be applied in any of the customary ways, which include spraying roller coating, dipping, and doctor blading. Spraying is generally the method of choice.

The composition is sprayed or otherwise applied to the article to be coated (thickness 0.2–0.6 mil dry) and is air-dried. A top-coat is applied over the prime-coated substrate. The article is then baked for from 0.5–30 minutes at a temperature of from 370° to 460° C.

The composition of this invention can be used without applying any additional fluorocarbon polymer coatings, if desired. It produces a finish having excellent thermal stability and non-stick properties. For this use the composition is ordinarily applied at a thickness of 0.2–2.5 mils (dry). After application, the composition is air-dried and the article baked for a time and at a temperature sufficient to fuse the fluorocarbon used.

The composition itself is made by (a) premixing the amine, the water-soluble alcohol, the alkyl benzene, the fatty acid, and the optional anti-mudcracking agent. (b) Mixing proper amount of a suitable colloidal silica and a suitable fluorocarbon polymer dispersion. (c) Adding the premixture to the colloidal silica-fluorocarbon and mixing. (d) Pigment is added by first preparing a suitable pigment dispersion according to any convention technique and adding this pigment dispersion to the silica-fluorocarbon-premixture composition.

The composition is most useful for coating cookware, especially bakeware, and for coating meat grills, but it can be used to coat any article capable of withstanding the baking temperature required to produce the finished article. For example, the composition can be used to coat bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers, and industrial containers and molds. It can also be used to coat plastic articles.

The following examples are representative of the invention. All parts and percentages are on a weight basis unless otherwise stated.

EXAMPLE 1

This example contrasts the viscosity increase, over a period of time, of a primer disclosed in the Welch application, Ser. No. 405,798, with the composition of this invention.

Two prime coating compositions were made in the conventional manner. The composition consisted of:

|  | A | | B | |
|---|---|---|---|---|
|  | Known Composition | | Composition of this invention | |
| Deionized water | 154.11 | parts by weight | 154.11 | |
| Aqueous dispersion of PTFE, 60% by weight solids | 1105.03 | " | 1105.03 | |
| Colloidal silica sol ("Ludox-AM") | 761.56 | " | 761.56 | |
| Isooctylphenoxy-polyethoxyethanol | 33.97 | " | — | |
| Toluene | 112.25 | " | 112.25 | Mix together before addition |
| Diethylene glycol monobutyl ether | 26.50 | " | 26.50 | |
| Silicone (60% by weight solids in xylene) | 67.20 | " | 67.20 | |
| Triethanolamine | — | " | 22.65 | |
| Oleic aid | — | " | 11.32 | |
| White mill base | 166.50 | " | 166.50 | |
| 45% TiO$_2$ | | | | |
| 54.5% demineralized water | | | | |
| .5% sodium polynapthalene sulfonate | | | | |

The compositions were thoroughly mixed and the resulting compositions were then sprayed onto a frit-coated aluminum panel to a thickness of 0.3 mil (dry) and dried in air. Both compositions had excellent adhesion to the panels.

The composition's viscosity, in centipoise, was measured at set time intervals. The measurement was with a Brookfield Viscometer, No. 1 spindle at 20 revolutions per minute. To measure higher viscosities the speed was turned down incrementally and if the indicator was still off-scale the spindle was changed, starting again at 20 rpm. The results are in the following table.

| Time | Composition A Temperature | | | Composition B Temperature | | |
|---|---|---|---|---|---|---|
| Days | 65° F | 120° F | 40° F | 65° F | 120° F | 40° F |
| 0 | 100 | 100 | 100 | 110 | 110 | 110 |
| 4 | 130 | 110 | 192 | 110 | 104 | 134 |
| 7 | 120 | 104 | 200 | 106 | 108 | 132 |
| 14 | 160 | 110 | 270 | 110 | 95 | 140 |
| 21 | 220 | 110 | 330 | 100 | 100 | 130 |
| 27 | 312 | — | 402 | 116 | 110 | 136 |
| 36 | 900 | 120 | 360 | 110 | 110 | 130 |
| 54 | 7,500 | 110 | 1000 | 100 | 140 | 110 |
| 74 | 13,700 more | 110 | 6000 more | 100 | 100 | 140 |

-continued

| Time | Composition A Temperature | | | Composition B Temperature | | |
|---|---|---|---|---|---|---|
| Days | 65° F | 120° F | 40° F | 65° F | 120° F | 40° F |
| 150 | than 2,000 | than 2,000 | than 1,500 | 100 | 110 | 140 |

This example shows the rapid and substantial increase in viscosity of the known primer composition, and the unexpected stability of the novel primer composition.

EXAMPLE 2

A prime-coating composition was made in the conventional manner. The composition consisted of:

| | Composition C | |
|---|---|---|
| Deionized water | 245.67 | |
| Aqueous dispersion PTFE, 60% by weight solids | 1105.03 | |
| Colloidal silica sol ("Ludox-AM") | 761.56 | |
| Toluene | 69.40 | mix together before addition |
| Diethylene glycol monobutyl ether | 16.39 | |
| Silicone (60% by weight solids in xylene) | 41.55 | |
| Triethanolamine | 14.00 | |
| Oleic acid | 7.00 | |
| Toluene | 42.86 | mill base |
| Diethylene glycol monobutyl ether | 10.11 | |
| Silicone (60% by weight solids in xylene) | 25.00 | |
| Triethanolamine | 8.64 | |
| Oleic acid | 4.0 | |
| Titanium oxide | 74.0 | |

The composition was thoroughly mixed and then sprayed onto a frit-coated aluminum panel to a thickness of 0.3 mil (dry) and dried in air. The composition had excellent adhesion to the panel.

The composition's viscosity was measured as in Example 1. The results are in the following table:

| | Temperature | | |
|---|---|---|---|
| Days | 65° F | 120° F | 40° F |
| 0 | 96 cps | 96 cps | 96 cps |
| 4 | 100 | 104 | 128 |
| 7 | 104 | 110 | 132 |
| 14 | 100 | 80 | 125 |
| 21 | 100 | 100 | 120 |
| 27 | 112 | — | 130 |
| 36 | 110 | 110 | 130 |
| 54 | 110 | 110 | 130 |
| 74 | 110 | 100 | 150 |
| 150 | 110 | 120 | 130 |
| 300 | 120 | 120 | 130 |

This example shows the stability of the primer composition over a 300 day period at various storage temperatures.

I claim:
1. A composition consisting essentially of
  a. 20–90%, by weight of total solids, a particulate fluorocarbon polymer;
  b. 10–80%, by weight of total solids, colloidal silica having a pH of 8.4–9.9 at 25° C., whose particles have a size of 5–100 millimicrons and specific surface area of 125–420 square meters per gram;
  c. 1–10%, by weight of total composition, alkyl benzene;
  d. 1–10%, by weight of total composition, alcohol containing 4 or more carbon atoms, said alcohol being miscible with water;
  e. 0.3–10%, by weight of total composition, fatty acid containing 8 or more carbon atoms;
  f. 1–15%, by weight of total composition, amine having the formula

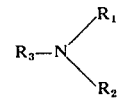

wherein $R_1$ contains 1 to 6 carbon atoms and may contain other functional groups, and $R_2$ and $R_3$ contain one to six carbon atoms or hydrogen; and
  g. a liquid carrier.
2. The composition of claim 1 further containing an anti-mudcracking agent, said agent being silicone, at a concentration up to 10%, by weight of total solids, or a polymeric adjunct, at a concentration of 5–25%, by weight of total solids.
3. The composition of claim 2 further containing up to 40%, by weight of solids, pigment.
4. The composition of claim 1 wherein the fluorocarbon polymer is polytetrafluoroethylene, a copolymer of tetrafluoroethylene and hexafluoropropylene in all monomer unit weight ratios, or a mixture thereof.
5. The composition of claim 1 wherein the fluorocarbon polymer is polytetrafluoroethylene.
6. The composition of claim 1 wherein the alkyl benzene is toluene.
7. The composition of claim 1 wherein the alcohol is diethylene glycol monobutyl ether.
8. The composition of claim 1 wherein the fatty acid is oleic acid.
9. The composition of claim 1 consisting essentially of:
  a. 55–65%, by weight of total solids, polytetrafluoroethylene;
  b. 15–30%, by weight of total solids, colloidal silica;
  c. 4–8%, by weight of the composition, toluene;
  d. 1–5%, by weight of the composition, diethylene glycol monobutyl ether;
  e. 0.4–5%, by weight of the compositon, oleic acid;
  f. 9–10%, by weight of the composition, triethanolamine;
  g. 1–5%, by weight of solids, silicone;
  h. 1–10%, by weight of solids, pigment.
10. An article bearing a coating of the composition of claim 1.

* * * * *